(12) United States Patent  
Raisch et al.

(10) Patent No.: US 7,921,177 B2
(45) Date of Patent: Apr. 5, 2011

(54) METHOD AND COMPUTER SYSTEM FOR PROVIDING REMOTE DIRECT MEMORY ACCESS

(75) Inventors: Christoph Raisch, Gerlingen (DE); Benjamin Bock, Leipzig (DE); Christian Stoeger, Freising (DE); Benedikt Waldvogel, Stegen (DE); Michael Prilop, Leipzig (DE)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 12/171,456

(22) Filed: Jul. 11, 2008

(65) Prior Publication Data
US 2009/0024714 A1    Jan. 22, 2009

(30) Foreign Application Priority Data

Jul. 18, 2007    (EP) .................................... 07112670

(51) Int. Cl.
*G06F 15/167*    (2006.01)
*G06F 15/16*    (2006.01)
(52) U.S. Cl. ........................................ 709/212; 709/217
(58) Field of Classification Search ........... 709/212–219, 709/225–245
See application file for complete search history.

(56) References Cited

U.S. PATENT DOCUMENTS

| 7,631,107 | B2 * | 12/2009 | Pandya | 709/250 |
| 7,633,955 | B1 * | 12/2009 | Saraiya et al. | 370/401 |
| 2004/0193832 | A1 * | 9/2004 | Garcia et al. | 711/202 |
| 2005/0060442 | A1 * | 3/2005 | Beverly et al. | 710/33 |
| 2006/0262796 | A1 * | 11/2006 | Biran et al. | 370/392 |

OTHER PUBLICATIONS

M.E. Baskey, M. Eder, D.A. Elko, B.H. Ratcliff, D.W. Schmidt, "zSeries Features for Optimized Sockets-Based Messaging: HiperSockets and OSA-Express," IBM Journal Res. & Dev., Jul./Sep. 2002, vol. 46, No. 4/5, pp. 475-485.

L. C. Heller, M. S. Farrell, "Millicode in an IBM zSeries Processor," IBM Journal Res. & Dev., May/Jun. 2004, vol. 48, No. 3/4. pp. 425-434.

Jeffrey C. Mogul, "TCP Offload is a Dumb Idea Whose Time Has Come," USENIX Association; Proceedings of HotOS IX: The 9th Workshop on Hot Topics in Operating Systems, May 2003, pp. 25-30.

* cited by examiner

*Primary Examiner* — Yasin Barqadle
(74) *Attorney, Agent, or Firm* — Cantor Colburn LLP; William Kinnaman (57) ABSTRACT

A method for providing remote direct memory access (RDMA) between two computers, preferably between central processing units (CPUs) and a functional subsystem of a computer system as part of their network communication, e.g. using TCP/IP. Tasks of analyzing network protocol data and the actual RDMA operations can be offloaded to the functional subsystem with this method. Further, the functional subsystem cannot compromise the status of the first computer system as only access to certain allowed memory locations is granted by a memory protection unit during phases of actual data transfer between the functional subsystem and the CPUs.

10 Claims, 7 Drawing Sheets

METHOD AND COMPUTER SYSTEM FOR PROVIDING REMOTE DIRECT MEMORY ACCESS

CROSS-REFERENCE TO RELATED APPLICATION

This application claims the priority benefit under 35 U.S.C. §119 of European (EP) application 07112670.0, filed Jul. 18, 2007, and incorporated herein by reference.

BACKGROUND OF THE INVENTION

1. Field of the Invention

The present invention relates to the data exchange between computers using networking protocols, especially between central processing units (CPUs) and functional subsystems of a computer system.

2. Description of the Related Art

A network adapter, also known as a network interface controller (NIC), is a piece of computer system hardware which allows computers to communicate over a computer network. In today's computer systems a network adapter is often implemented as an integrated circuit on a chip which is directly mounted on a printed circuit board of the computer system hardware, e.g. on a so-called motherboard. The network adapter can be implemented as part of the regular chipset of the computer system itself, or it can be implemented as low cost dedicated chip. For larger computer server systems a network adapter is often provided in form of a network adapter card instead (a printed circuit card comprising chips), which is plugged into special slots of the computer system hardware. Such expansion cards are either optional or mandatory for a computer system. In both variants, the network adapter hardware is connected to bus systems of the computer system.

In general, there are four techniques used to transfer data over a computer network using network adapters. Polling is where a processor of the computer system, e.g., a central processing unit (CPU), examines the status of the network adapter under program control. Programmed input/output (I/O) is where a processor of the computer system alerts the network adapter by applying its address to the computer system's address bus. Interrupt driven I/O is where the network adapter alerts a processor of the computer system that it is ready to transfer data. Direct memory access (DMA) is where an intelligent network adapter assumes control of a computer system bus to access computer system memory directly. This removes load from the processors of the computer system but requires a separate processor in the network adapter. A disadvantage is that only trusted network adapter hardware can be used because the direct access to memory of the computer system (e.g., to the main memory) can compromise the security of the computer system.

In case of an Ethernet adapter, a DMA method for sending data typically comprises the following steps. In a first step data together with a data descriptor is prepared for the Ethernet adapter and afterwards the Ethernet adapter is triggered by a processor of the computer system. Then the Ethernet adapter fetches the data descriptor and subsequently the data based on the information about the data provided in the data descriptor. Then the Ethernet adapter sends the data over the computer network. When the sending is completed, the Ethernet adapter prepares an update completion descriptor and informs the processor by sending an interrupt. The problem with this approach is that there is a long round-trip time between the preparation of the data to be send and the notification of the completion of the sending of the data.

In case of an InfiniBand network adapter, a DMA method for sending data typically comprises the following steps. In a first step data is prepared for the InfiniBand adapter and a processor of the computer system writes the data directly into the memory of the InfiniBand adapter. Then the InfiniBand adapter sends the data over the computer network. The processor of the computer system gets a notification from the InfiniBand adapter in case of an error only. While this approach has advantages compared to the described Ethernet send method, the disadvantage is that some existing operating systems for a computer system (e.g., IBM z/OS for IBM System z) are not prepared to use this method because it does not fit into the usual send/receive pattern. But often changes to an operating system are not desirable for various reasons, e.g. in order to save implementation costs.

InfiniBand network transport is based on Remote Direct Memory Access (RDMA), which is also referred to as "hardware put/get" or "remote read/write". For RDMA, the network adapter implements the RDMA protocol. RDMA allows data to move directly from the memory of one system into that of another without involving either one's operating system. This permits high-throughput, low-latency networking. Memory buffer references called region IDs are exchanged between the connection peers via RDMA messages sent over the transport connection. Special RDMA message directives ("verbs") enable a remote system to read or write memory regions named by the region IDs. The receiving network adapter recognizes and interprets these directives, validates the region IDs, and performs data transfers to or from the named regions. Even for RDMA network protocols require to perform certain steps in sequence when interpreting the network protocol data.

A functional subsystem of a computer system is responsible for the provision of dedicated functions within the computer system. Especially, a functional subsystem can execute its own operating system instance, which is often the case for controllers embedded in the computer system. One example for a functional subsystem is an I/O subsystem providing certain I/O functions, e.g. an I/O subsystem providing network access for the CPUs. In this case, the I/O subsystem would typically be encapsulated by firmware components of the computer system or by operating system instances executed on the CPUs, e.g. by their kernels and/or by device drivers.

Another example is an entire general purpose computer embedded within the computer system, preferably a computer having a different architecture than the CPUs. Such embedded general purpose computer could be used to execute certain types of application workloads for which it is better suited than the CPUs. An example scenario is to run a database system on the CPUs and a web server on the functional subsystem, where the web server accesses the database system. In this case, the split between the CPUs and the functional subsystem is done on the application level. Therefore, special tasks in the application level are delegated to the functional subsystem.

For various reasons it is desirable to exchange data between the CPUs and the functional subsystems via networking protocols. For example, this simplifies the implementation of the data transfer significantly. However, a low latency and high bandwidth data exchange between the CPUs and the functional subsystems is often crucial for such computer systems. Therefore, the use of RDMA between the CPUs and the functional subsystem is desirable.

The DMA and RDMA environments are essentially hardware environments. This provides advantages but it also entails some risk and limitations. As described in J. C. Mogul, "TCP offload is a dumb idea whose time has come", *Proc. of Hot OS IX: The 9th Workshop on Hot Topics in Operating Systems*, USENIX Association, RDMA introduces many co-development dependencies between the various hardware and software components involved in the overall computer system.

Further, RDMA introduces several problems, especially in the area of computer system security. For example, an operating system executed on the functional subsystem is typically not as secure and reliable as an operating system executed on the CPUs. But once the operating system on the functional subsystem is compromised, it is also possible to compromise an operating system executed on a CPU.

In order to provide an efficient memory protection mechanism across applications on different nodes within a multi-node computer system, wherein the applications exchange data via RDMA, U.S. Patent Application Publication US 2006/0047771 A1 proposes the use of global translation control entry tables that are accessed/owned by the applications and are managed by a device driver in conjunction with a protocol virtual offset address format. But this mechanism requires a symmetric design, in which RDMA operations can be triggered from both sides of the exchange. For a functional subsystem of a computer system, however, it is desirable that the RDMA is performed by the functional subsystem only in order to offload RDMA operations from the CPUs. Such offloading provides not only performance benefits, but can also reduce the design complexity for computer system. For example, it can be complex and expensive to implement the RDMA support on the CPUs. Further, this approach requires adaptations to the operating systems for which data is exchanged in-between.

Also the U.S. Pat. No. 7,181,541 B1 describes an RDMA approach, wherein a memory protection unit is used to prevent access to unauthorized memory addresses during the RDMA data exchange. However, also this approach requires adaptations to the operating systems for which data is exchanged in-between.

SUMMARY OF THE INVENTION

It is therefore an object of the present invention to provide a method for providing remote direct memory access that is improved over the prior art, and a corresponding computer program and computer program product, and a corresponding computer and computer system.

This object is achieved by the invention as defined in the independent claims. Further advantageous embodiments of the present invention are defined in the dependant claims.

The advantages of the present invention are achieved by a method for providing remote direct memory access data transfers between a first and a second computer, wherein said first and said second computer communicate with one another through communication adapters coupled to a network and wherein the communication adapter of said second computer can remotely access a memory of said first computer, and wherein buffers for the data exchange are created in said memory, and wherein said first computer executes at least one operating system and comprises a protocol engine which is not part of the at least one operating system, said method comprising the steps of:

said protocol engine analyzing a subset of the data in said buffers to determine allowed memory locations in said memory, wherein in said allowed memory locations the data to be exchanged is stored already by said first computer and/or will be stored by said second computer;

said protocol engine configuring a memory protection unit of said first computer to grant at least one of the following: remote read access by the communication adapter of said second computer to said allowed memory locations, remote write access by the communication adapter of said second computer to said allowed memory locations;

said protocol engine generating data packets comprising address information for said allowed memory locations and sending said data packets to said second computer;

responsive to receiving said data packets exchanging data between said first and said second computer by said second computer remotely accessing said allowed memory locations in said first computer using said address information via said memory protection unit; and said protocol engine reconfiguring said memory protection unit to prevent remote access by the communication adapter of said second computer to said allowed memory locations.

In one embodiment of the present invention, a network protocol analyzing step is performed on said data packets in the exchanging step.

The memory protection unit is preferably part of the communication adapter of said first computer system already and can be reused for the inventive method.

In the preferred embodiment of the invention, said second computer is embedded in said first computer and serves in this computer system as a functional subsystem. This provides the advantage that many tasks of analyzing network protocol data and the actual RDMA operations can be offloaded to the functional subsystem. Further, the functional subsystem cannot compromise the status of the first computer system as only access to certain allowed memory locations is granted during phases of actual data transfer between the functional subsystem and the first computer. Preferably, CPUs and the functional subsystem communicate via a higher level protocol such as the TCP/IP (Transmission Control Protocol/Internet Protocol) protocol. Therefore, expensive adaptations for the first computer system are reduced to adaptations in the functional subsystem.

A simple embodiment of the invention is the connection of two general purpose computer systems via a network (e.g., via InfiniBand switches), wherein certain firmware and/or operating system components are adapted to implement a method in accordance with the present invention.

BRIEF DESCRIPTION OF THE DRAWINGS

The present invention and its advantages are now described in conjunction with the accompanying drawings.

DETAILED DESCRIPTION

HiperSockets and OSA-Express

Special network data transfer methods used in IBM System z computer systems are described in M. E. Baskey et al., "zSeries features for optimized sockets-based messaging: HiperSockets and OSA-Express", *IBM J. Res. & Dev.*, Vol. 46, No. 4/5, July/September 2002, pp. 475-485. OSA-Express stands for Open Systems Adapter-Express, a networking feature available on the IBM System z9 and IBM eServer zSeries servers.

Figure 1:
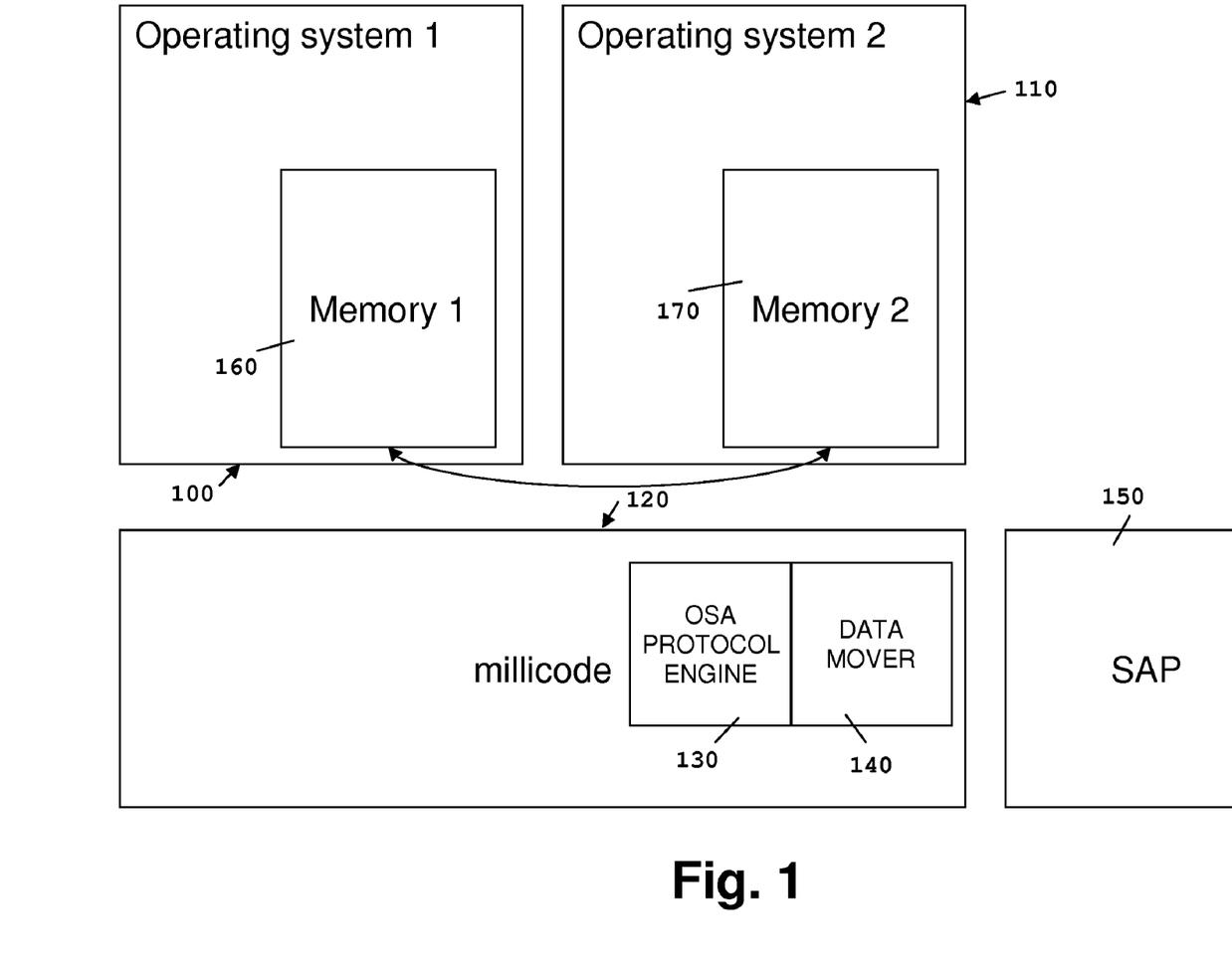
FIG. 1 is a block diagram of a computer system supporting HiperSockets.

FIG. 1 illustrates the HiperSockets approach, wherein a data transfer using the OSA protocol between two operating system partitions 100 and 110 takes place. Data transfers between a CPU and a functional subsystem and between a CPU and other computer systems are not possible. The data transfer is implemented by the millicode 120, a special component of the System z firmware. The implementation of the millicode 120 is described in L. C. Heller and M. S. Farrell, "Millicode in an IBM zSeries processor", *IBM J. Res. & Dev.*, Vol. 48, No. 3/4, May/July 2004, pp. 425-434.

For the HiperSockets implementation the millicode 120 comprises two dedicated components, the OSA protocol engine 130 and the data mover 140. The OSA protocol engine 130 controls the interaction between the partitions 100 and 110 and the millicode 120. The HiperSockets data transfer method basically comprises the following steps. In a first step the partitions 100 and 110 set data queues and network addresses by communication to the system assist processor (SAP) 150. Then partition 110 prepares a receive queue in its assigned memory partition 170 and informs the millicode 120 that the receive buffers are available. Partition 100 prepares a send queue, stores data to be sent in its assigned memory partition 160, and informs the millicode 120 about data to be sent via a Signal Adapter (SIGA) instruction. Then the data mover 140 transfers the data from memory partition 160 to memory partition 170. Finally, the OSA protocol engine synchronously informs the partitions 100 and 110 by signaling through memory partition 160 and memory partition 170 and interrupts that the data transfer is completed.

A main disadvantage of the HiperSockets approach is that the support for the interpretation of the OSA protocol in the millicode 120 is very complicated and therefore expensive to implement. This is mainly caused by the fact that the processor instructions available for the implementation of the millicode 120 can only be a subset of the instructions supported by the CPU—the subset which is directly implemented in the CPU hardware. This subset has several limitations.

Figure 2:
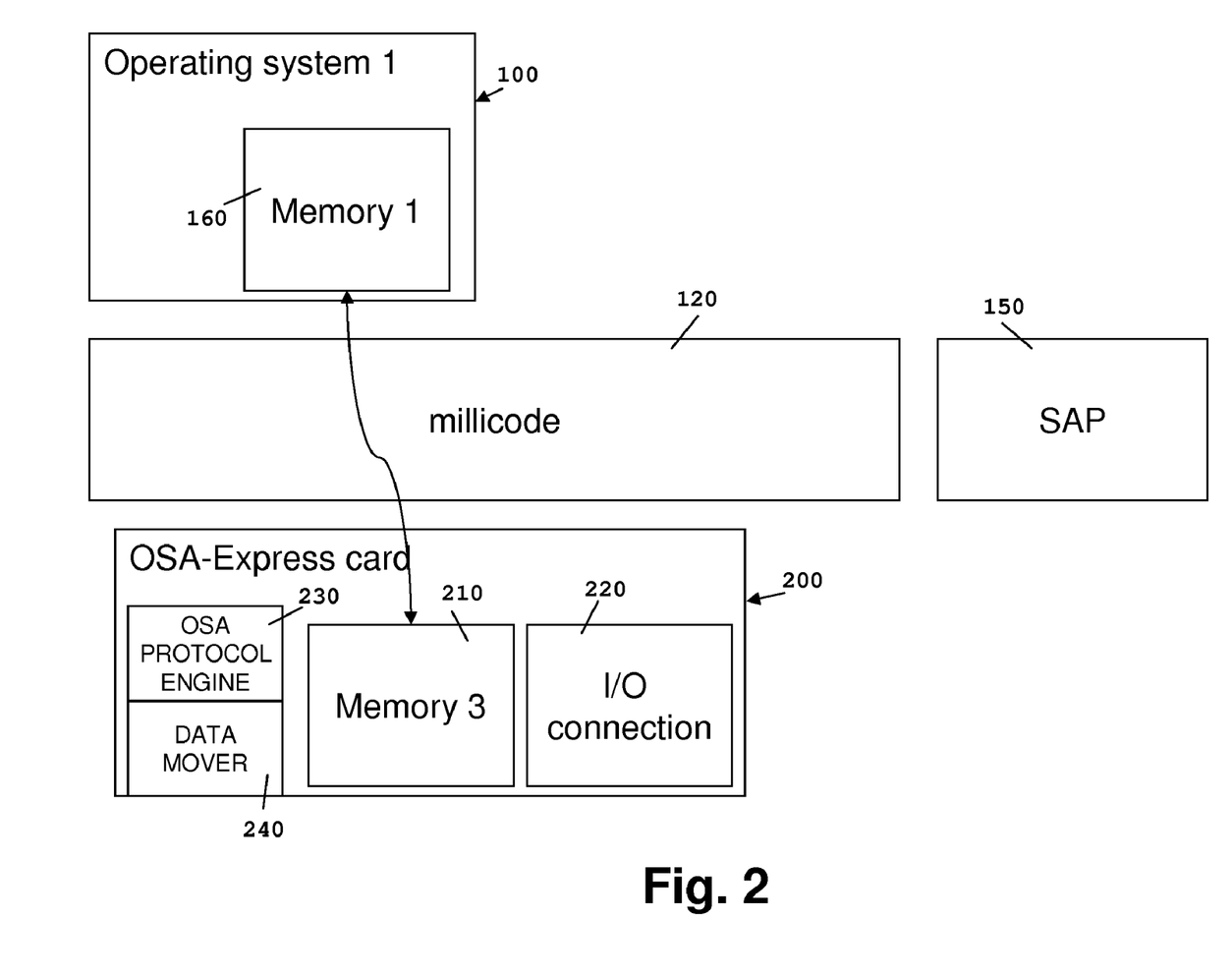
FIG. 2 is a block diagram of a computer system supporting OSA-Express network communication.

FIG. 2 illustrates the OSA-Express approach, which allows data exchange between CPUs and functional subsystems and other computer systems. An OSA-Express card 200 is plugged into the computer system, which is used by the partition 100 to send and receive data over an Ethernet connection. The OSA-Express card 200 comprises its own memory 210 and an I/O connection 220 for an Ethernet connection. The OSA-Express card 200 further comprises an OSA protocol engine 230 and a data mover 240. The OSA protocol engine 230 controls the interaction with the partitions 100, the millicode 120, and the SAP 150.

In a first step of the OSA-Express send method, partition 100 is setting up data queues and networking addresses by communicating to the SAP 150. As part of this communication, the SAP 150 communicates to the OSA-Express card 200, which prepares buffers in its memory 210. Then partition 100 prepares a send queue and stores data in its assigned memory partition 160. Then partition 100 informs the millicode 120 about data to be send via a SIGA instruction. The millicode informs the OSA-Express card 200 to check for data transfers pending. The data mover 240 reads then the memory partition 160 to find out which data is to be transferred and copies this data to its memory 210. This data stored in its memory 210 will then be sent by the OSA-Express card 200 via the I/O connection 220 over the Ethernet. Afterwards, the OSA-Express card 200 writes send completions to the memory partition 160 and informs the millicode 120 to trigger a completion interrupt for partition 100.

In a first step of the OSA-Express receive method, partition 100 is setting up data queues and networking addresses by communicating to the SAP 150. As part of this communication, the SAP 150 communicates to the OSA-Express card 200, which prepares buffers in its memory 210. Then partition 100 prepares a receive queue and creates receive buffers in its assigned memory partition 160. Then partition 100 informs the millicode 120 about the receive buffers via a SIGA instruction. The millicode informs the OSA-Express card 200 to update its buffer list. The OSA-Express card 200 reads then the memory partition 160 to find out the buffer list. The OSA-Express card 200 receives data from its I/O connection 220 and stores it in its memory 210. Then the data mover 240 copies this data to the memory partition 160 into the buffers and marks these buffers as filled. Afterwards, the OSA-Express card 200 informs the millicode 120 to trigger a receive interrupt for partition 100.

The OSA-Express approach has various problems as the OSA-Express card 200 interprets the OSA protocol. The connection between the OSA-Express card 200 and the memory partition 160 has a latency T. Sending and receiving data requires multiple sequential data transfers between the OSA-Express card 200 and the memory partition 160 before an actual data transfer can be performed. In case of n such transfers, the overall latency is greater than n*T. During a setup phase, extensive communication between the SAP 150 and the OSA-Express card 200 is needed in order to establish communication paths, which leads to complex dependencies between the firmware executed by SAP 150 and the firmware of the OSA-Express card 200. Further, the direct access of the OSA-Express card to the memory partition 160 compromises the security and function of the computer system. Especially, it is not possible to use an "untrusted" OSA-Express card 200.

Condensed Transfer OSA Protocol (CTOP)

For the preferred embodiment of the invention, certain aspects of HiperSockets and OSA-Express are combined. A split in the OSA protocol interpretation will be introduced between the millicode and a functional subsystem, such that the millicode is responsible for the memory protection of the memory used for RDMA, whereas the functional subsystem is responsible for the actual OSA protocol interpretation. In its OSA protocol interpretation step, the millicode will be collecting the data which will be transferred to the functional subsystem and establish the memory protection. Therefore, only few modifications to the millicode are necessary, hence omitting many complicated and therefore expensive changes to the millicode.

Figure 3:
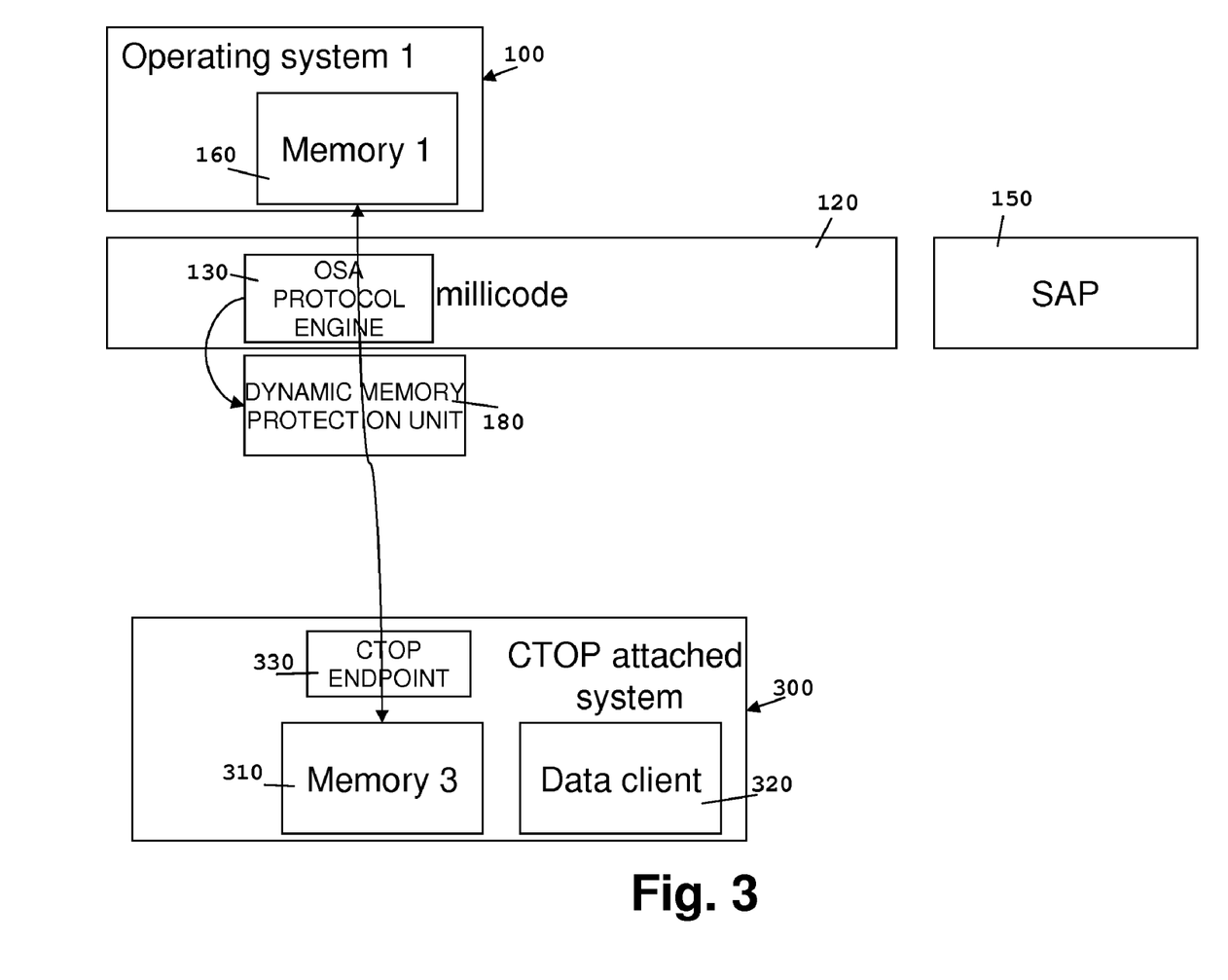
FIG. 3 is a block diagram of a computer system supporting OSA-Express network communication in accordance with the present invention.

FIG. 3 shows a computer system in accordance with the present invention, which implements an OSA-Express network communication. For the preferred embodiment of the present invention, the network communication is using the TCP/IP (Transmission Control Protocol/Internet Protocol) protocol. A special CTOP system 300 is attached to the computer system and comprises its own memory 310, a data client 320, and a CTOP endpoint 330. The attachment can be achieved in various ways, e.g. via I/O bus or network connections. For the preferred embodiment, the CTOP system 300 is embedded in the computer system (it is part of the computer system).

The data client 320 is responsible for performing the tasks of a functional subsystem of the computer system. For example, it can be a single application in an operating system instance executed by a processor of the CTOP system 300, e.g. a web server that communicates via TCP/IP with a data base system in the partition 100. A further example is a case where the data client 320 implements an I/O subsystem for the computer system. However, it is also possible that the data client 320 provides the partition 100 with a network connection to a different computer system, for example to another data client in a CTOP system attached to this separate computer system.

The OSA protocol engine 130 of the millicode 120 will be modified such that it performs a first interpretation stage of the OSA protocol and controls a dynamic memory protection unit 180 in order to allow unidirectional access to the memory partition 160 assigned to the partition 100. This memory access will be granted as necessary by the state of the OSA protocol. Therefore, the checking of the main memory access is done by memory access hardware on a "trusted" side of an OSA connection. The dynamic memory protection unit 180 is a special hardware part of the computer system. For example, it could be provided by a dedicated chip providing InfiniBand or PCI-Express (PCI: Peripheral Component Interface) support.

Connection establishment, error handling and recovery are abstracted by the SAP 150 and by the CTOP endpoint 330, which performs a second interpretation stage of the OSA protocol. Complex connection establishment procedures are only performed by the SAP 150. This allows a simple implementation for the CTOP endpoint 330. If the CTOP endpoint 330 tries to access memory addresses which are not within the data areas in transfer, the dynamic memory protection unit 180 refuses the access and informs the SAP 150 for further error recovery actions.

On a trigger from the partition 100 via a SIGA instruction, the OSA protocol engine 130 interprets the OSA protocol on the sending side and collects data for a single I/O operation from multiple locations in the memory partition 160 into a single data packet. This data packet is called CTOP packet. Also on a trigger from the partition 100 the OSA protocol engine 130 interprets the OSA protocol on the receive side, finds free buffers in the memory partition 160, and transfers the addresses of those buffers together with completion handling information in a single CTOP packet to the CTOP endpoint 330.

Figure 4:
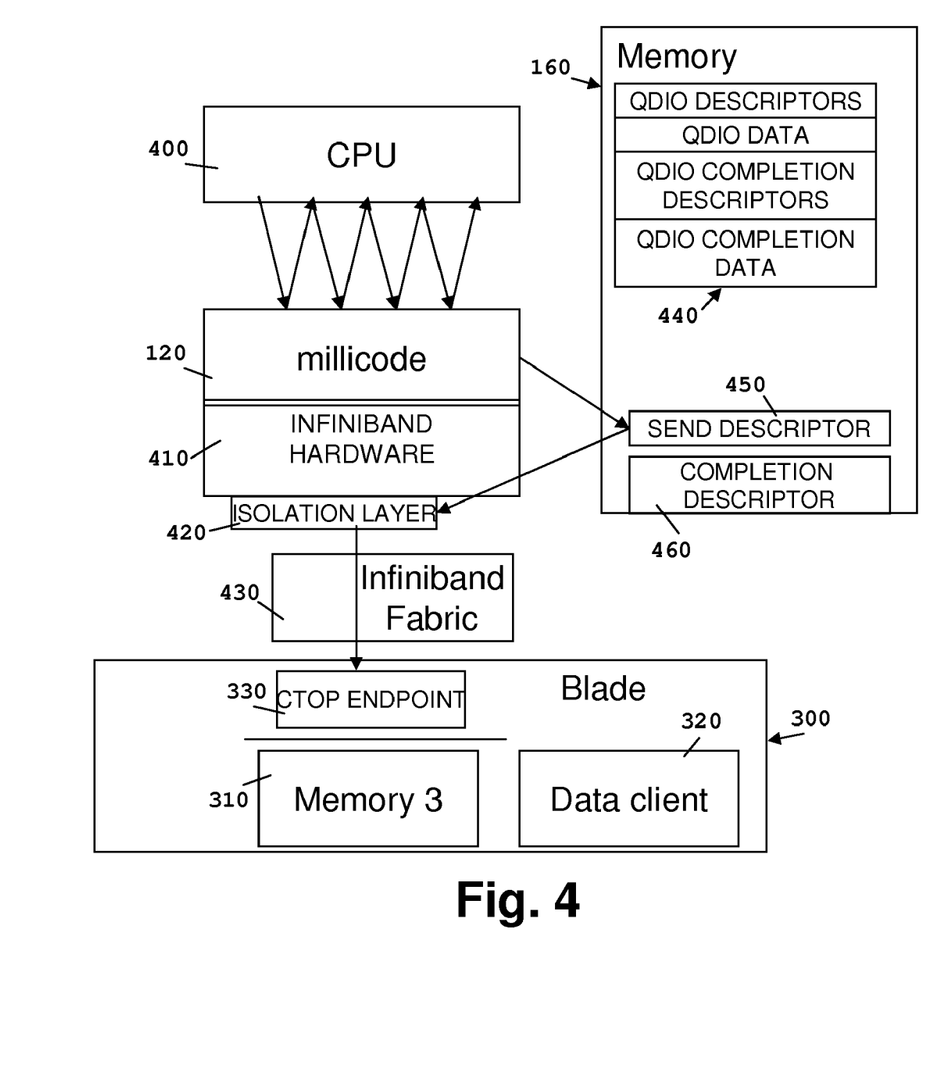
FIG. 4 is a block diagram of a computer system supporting InfiniBand network communication in accordance with the present invention.

FIG. 4 provides a more detailed view of a computer system with an attached CTOP system 300. An example implementation for the CTOP system 300 is a Blade server in an IBM BladeCenter which is embedded in an IBM System z mainframe computer. A CPU 400 of the computer system and the memory partition 160 are associated to the operating system partition 100. The computer system uses a special InfiniBand hardware 410, which is connected to an InfiniBand fabric 430 via an isolation layer 420. An example implementation for such isolation layer 420 is an InfiniBand transport system, e.g. as part of a chip providing the InfiniBand support. In the preferred embodiment, the isolation layer 420 also comprises the dynamic memory protection unit 180. The CTOP endpoint 330 of the CTOP system 300 is also connected to the InfiniBand fabric 430.

The CPU 400 prepares a data packet 440 including QDIO (queued direct I/O) data and descriptors for the OSA communication by executing existing firmware. The CPU 400 triggers the millicode 120 as in case of a normal OSA-Express adapter. The millicode 120 prepares a send descriptor 450 and a completion descriptor 460. Then the millicode 120 triggers the InfiniBand hardware 410, which is tightly coupled to the CPU 400 and the memory partition 160. The millicode 120 controls the InfiniBand hardware 410 in order to restrict the access to the memory partition 160 from the InfiniBand fabric 430. So the InfiniBand hardware 410 and the isolation layer 420 implement the dynamic memory protection unit 180.

Instead of a single InfiniBand fabric 430, it is also possible to use multiple interconnected InfiniBand switches, which establishes multiple switch stages. Instead of InfiniBand connections, also PCI-Express connections can be used.

Figure 5:
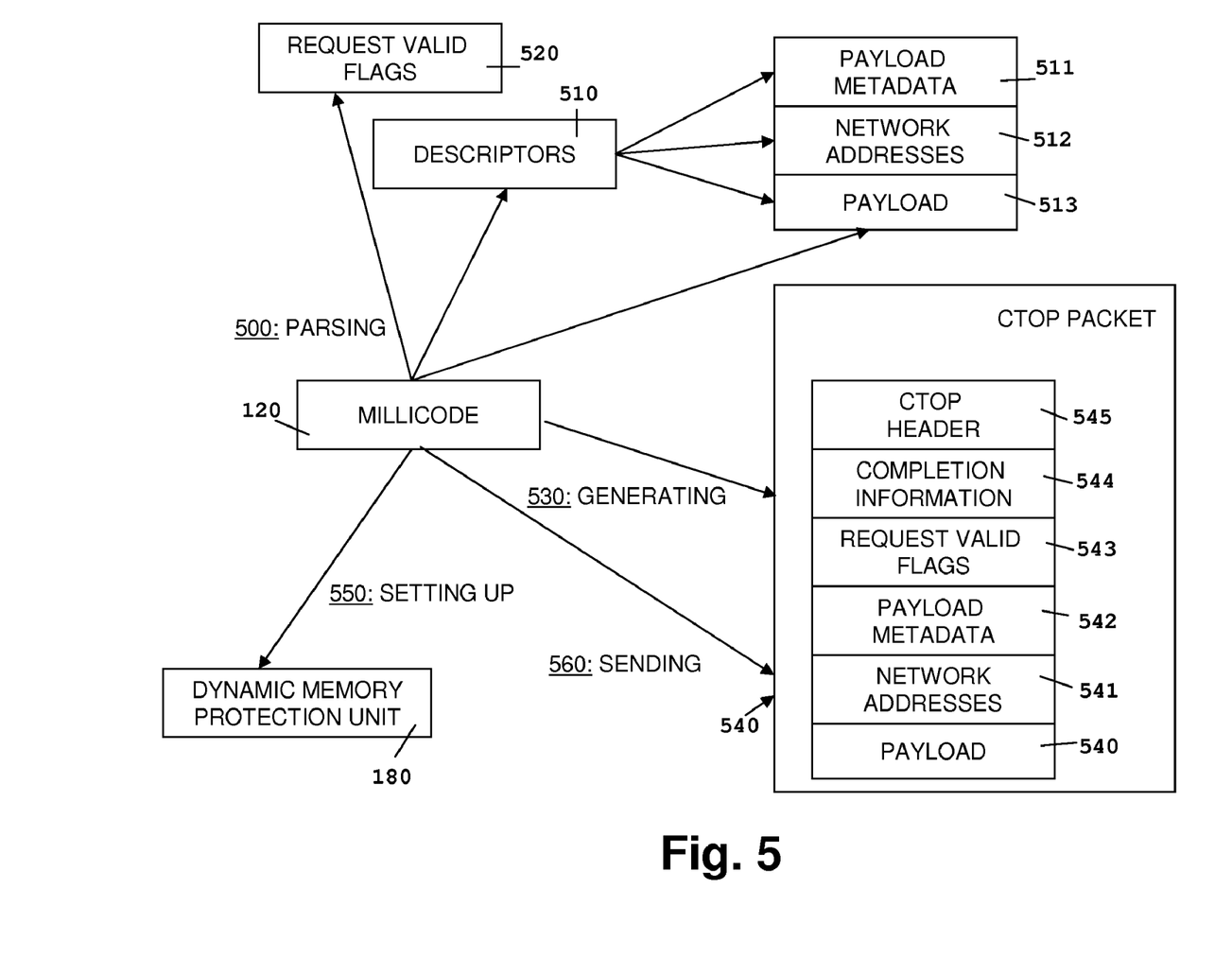
FIG. 5 is a flow diagram illustrating a send method in accordance with the present invention.

FIG. 5 illustrates a send method in accordance with the present invention, where data is sent from the partition 100 to the data client 320. On a SIGA instruction performed by the partition 100 on the CPU 400, the millicode 120 parses in step 500 the descriptors 510 and the request valid flags 520 as provided by the partition 100. The descriptors 510 comprise payload metadata 511, network addresses 512, and the actual payload 513 for the send requests. Examples for network addresses 512 are MAC (media access control) addresses. The parsed information will be used by the millicode 120 to validate source and network addresses of the various requests encoded in the descriptors 510 and the request valid flags 520. For all valid requests, the millicode 120 creates in step 530 a CTOP packet 540 with a CTOP header 546.

The CTOP packet 540 comprises an actual payload 541, which is the payload for the particular send request stored in the payload 513. The network addresses for the particular request as stored in the network addresses 512 are contained in the network addresses 542 field of the CTOP packet 540. The payload metadata for the particular request as stored in the payload metadata 511 are contained in the payload metadata 543 field of the CTOP packet 540. The request valid flags for the particular request as stored in the request valid flags 520 are contained in the request valid flags 544 field of the CTOP packet 540. Information how to signal packet send completions to the partition 100 are contained in the completion information 545 field of the CTOP packet 540.

In step 550 the millicode 120 reprograms the dynamic memory protection unit 180 to allow read access to the CTOP packet 540 by the CTOP endpoint 330. Then in step 560 the millicode 120 instructs the CTOP system 300 to asynchronously transfer the CTOP packet 540 or all the CTOP packets generated in step 530. Depending on the actual sizes of the payload fields of the CTOP packets, the millicode 120 can send only the addresses of the payload fields to the CTOP endpoint 330. The actual payload data will then be fetched by the CTOP endpoint 330 through the dynamic memory protection unit 180 afterwards.

The CTOP endpoint 330 receives the CTOP packet 540, interprets the CTOP header 546 and forwards the payload 541 to the data client 320. In case the payload data of the send request is too large to fit into a single CTOP packet 540, the CTOP endpoint 330 fetches the rest of the payload data from the payload 513. The CTOP endpoint 330 signals to the millicode 120 by sending a CTOP packet with appropriate data in the completion information 545 field that the data has been delivered.

Figure 6:
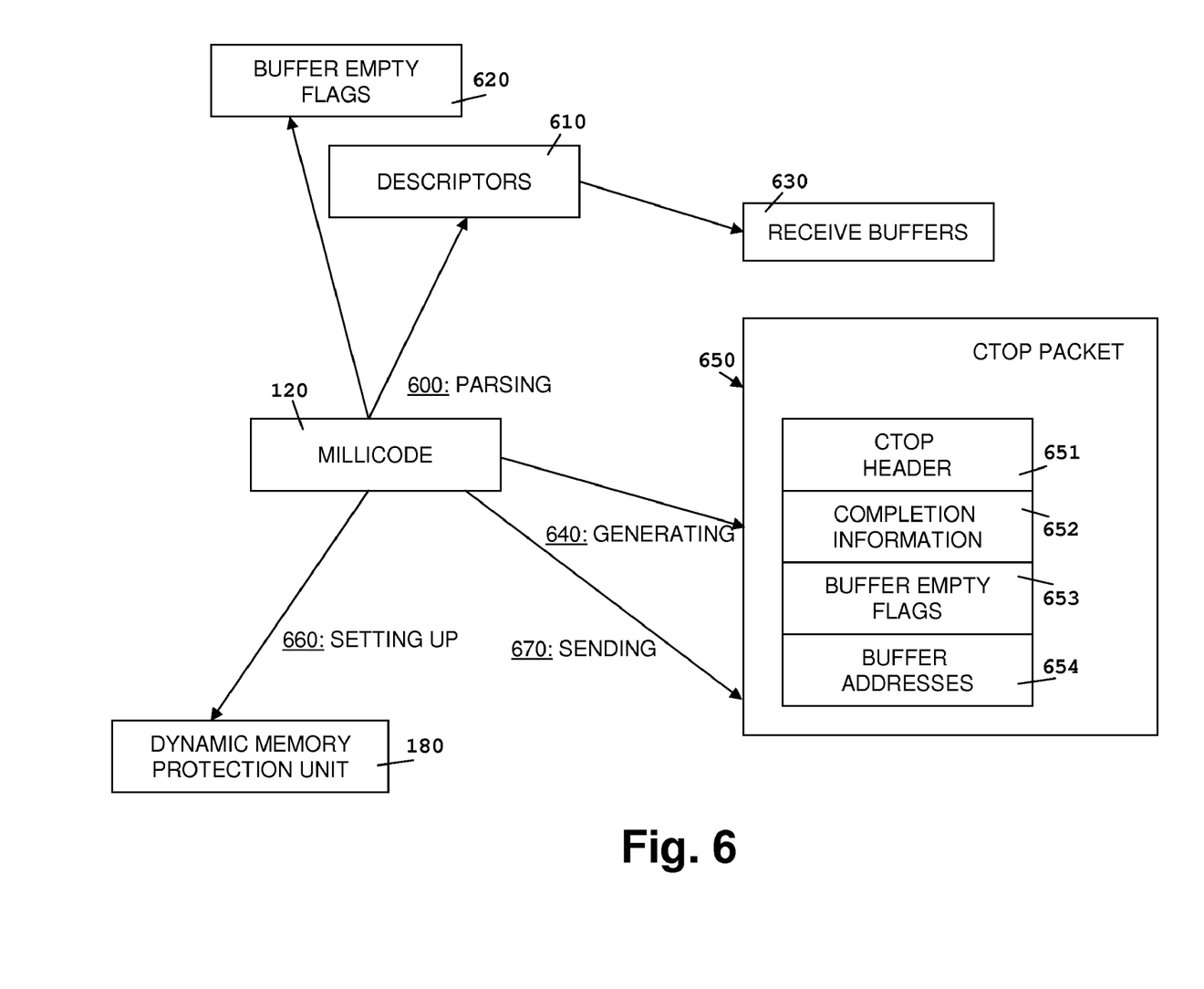
FIG. 6 is a flow diagram illustrating a receive method in accordance with the present invention.

FIG. 6 illustrates a receive method in accordance with the present invention, wherein data sent by the data client 320 is received by the partition 100. On a SIGA instruction performed by the partition 100 on the CPU 400, the millicode 120 parses in step 600 the descriptors 610 and the buffer empty flags 620 as provided by the partition 100. The descriptors 610 comprise the receive buffers 630 associated to a particular receive request. For empty receive buffers associated to a particular receive request, the millicode 120 generates CTOP packets. Such a CTOP packet 650 comprises a CTOP header 651 and in the completion information 652 field information how to signal packet received completions to the partition 100. The buffer empty flags 653 field of the CTOP packet 650 contains the information to be stored in the buffer empty flags 620. The buffer addresses 654 field of the CTOP packet 650 comprises the addresses of the receive buffers 630.

In step 660 the millicode 120 reprograms the dynamic memory protection unit 180 to allow write access to the CTOP packet 650 and the receive buffers 630 by the CTOP endpoint 330. Then in step 670 the millicode 120 instructs the CTOP system 300 to asynchronously send the CTOP packet 540 or all the CTOP packets generated in step 530.

The CTOP endpoint 330 collects all CTOP packets describing receive buffers—the CTOP receive messages—in its memory 310 asynchronously. The data client 320 sends data by storing it in the memory 310. The CTOP endpoint 330 verifies if it still has information about receive buffers. If no empty receive buffers are available, then the CTOP endpoint 330 performs one of the following based on a configuration option selected by the data client 320: it queues the data, it waits until empty buffers are available, or it informs the data client 320 about this condition. When empty receive buffers are available, the CTOP endpoint 330 interprets the stored CTOP receive messages in order to find out where the received data needs to be stored in the memory partition 160. Once the CTOP endpoint 330 finished the transfer of the received data to the receive buffers, it updates the request valid flags and signals the millicode 120 to inform the partition 100.

After sending or receiving is complete, the millicode 120 will re-program the dynamic memory protection unit 180 to prevent the access to the locations in memory 160 by the CTOP endpoint 330.

Additional Embodiment Details

The described techniques may be implemented as a method, apparatus or article of manufacture involving software, firmware, microcode, hardware and/or any combination thereof. The term "article of manufacture" as used herein refers to code or logic implemented in a medium, where such medium may comprise hardware logic (e.g., an integrated circuit chip, programmable gate array (PGA), application-specific integrated circuit (ASIC), etc.) or a tangible computer-readable medium, such as magnetic storage medium (e.g., hard disk drives, floppy disks, tape, etc.), optical storage (CD-ROMs, optical disks, etc.), volatile and non-volatile memory devices (e.g., electrically erasable programmable read-only memory (EEPROM), read-only memory (ROM), programmable read-only memory (PROM), random-access memory (RAM), dynamic random access memory (DRAM), static random-access memory (SRAM), flash, firmware, programmable logic, etc.). Code in the computer-readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer-readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
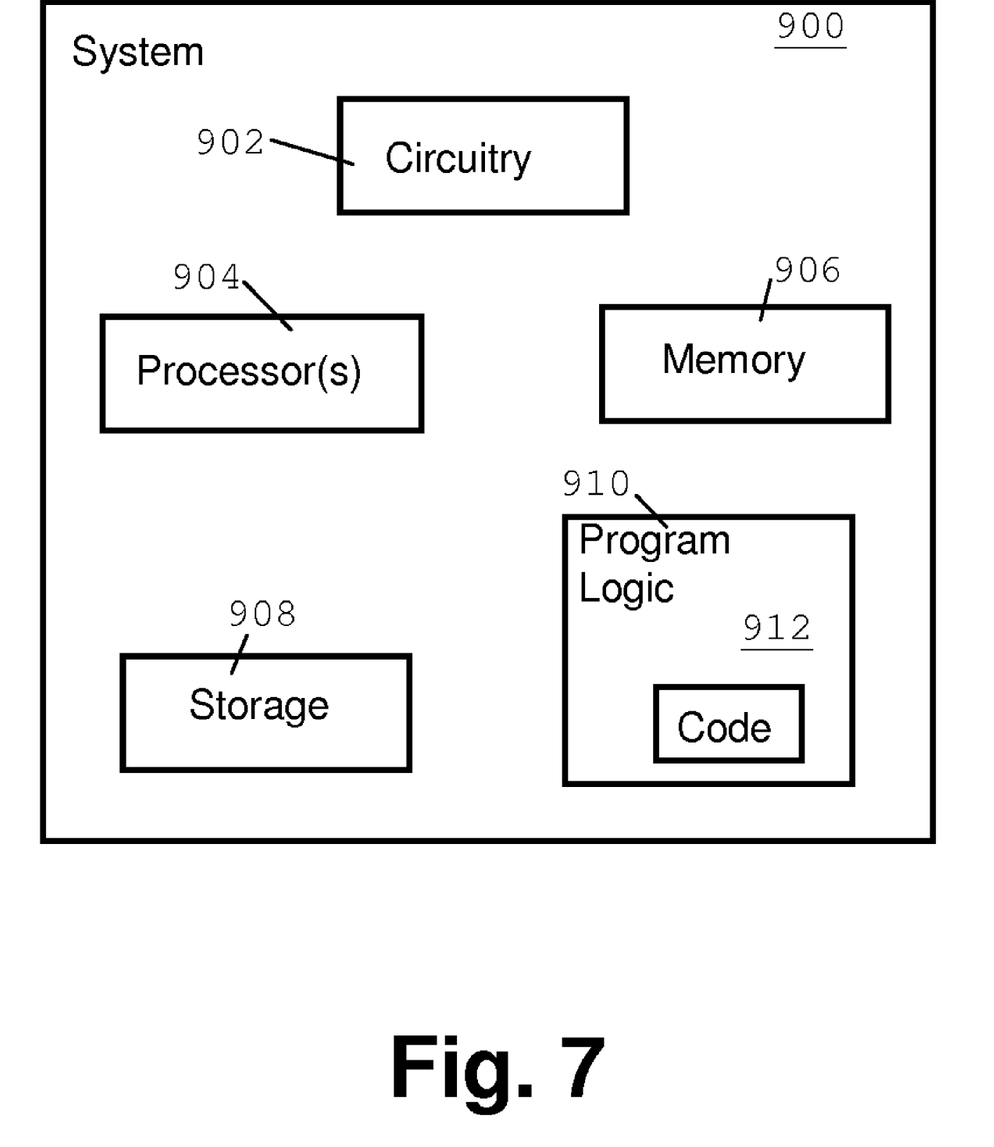
FIG. 7 is a block diagram of a system in which certain embodiments may be implemented.

FIG. 7 illustrates a block diagram of a computer system 900 in which certain embodiments may be implemented. The system 900 may include a circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the microprocessor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for providing remote direct memory access data transfers between a first computer and a second computer, wherein said first computer and said second computer communicate with one another through communication adapters coupled to a network and wherein the communication adapter of said second computer can remotely access a memory of said first computer, and wherein buffers for data exchange are created in said memory, and wherein said first computer executes at least one operating system and comprises a protocol engine which is not part of the at least one operating system, said method comprising the steps of:
   a) said protocol engine analyzing a subset of data in said buffers to determine allowed memory locations in said memory, wherein in said allowed memory locations data to be exchanged is stored already by said first computer and/or will be stored by said second computer;
   b) said protocol engine configuring a memory protection unit of said first computer to grant at least one of the following: remote read access by the communication adapter of said second computer to said allowed memory locations, remote write access by the communication adapter of said second computer to said allowed memory locations;
   c) said protocol engine generating data packets comprising address information for said allowed memory locations and sending said data packets to said second computer;
   d) responsive to receiving said data packets, exchanging data between said first and said second computer by said second computer remotely accessing said allowed memory locations in said first computer using said address information via said memory protection unit; and
   e) said protocol engine reconfiguring said memory protection unit to prevent remote access by the communication adapter of said second computer to said allowed memory locations;
   wherein said second computer is embedded within said first computer.

2. The method of claim 1, wherein a network protocol analyzing step is performed on said data packets in the exchanging step d).

3. A computer program loadable into internal memory of a digital computer system comprising software code portions for performing a method according to claim 1 when said computer program is run on said computer system.

4. A computer program product comprising a non-transitory computer-usable medium embodying program instructions executable by a computer, said embodied program instructions comprising a computer program loadable into internal memory of a digital computer system comprising software code portions for performing a method according to claim 1 when said computer program is run on said computer system.

5. A computer system comprising a first computer and a second computer, wherein said first computer and said second computer communicate with one another through communication adapters coupled to a network and wherein the communication adapter of said second computer can remotely access a memory of said first computer, said computer system comprising means for implementing the method according to claim 1.

6. The computer system of claim 5, where the steps a) to c) and e) are performed on a central processing unit of said first computer by at least one of the following: a firmware component, a millicode component.

7. The computer system of claim 1, where said second computer is a functional subsystem of said first computer.

8. The computer system according to claim 5, where said network comprises at least one of the following: InfiniBand connections, PCI-Express connections.

9. The computer system according to claim 5, where said memory protection unit is part of the communication adapter of said first computer.

10. A computer adapted to be used as a first computer and/or a second computer according to claim 5.

* * * * *